United States Patent [19]

Zillig et al.

[11] Patent Number: 4,902,043

[45] Date of Patent: * Feb. 20, 1990

[54] FLUID COUPLING AND SEAL ASSEMBLY

[75] Inventors: Steven R. Zillig, 8828 Main St., Williamsville, N.Y. 14221; James E. Caroll, Clarence, N.Y.

[73] Assignees: John T. Hoskins; Steven R. Zillig

[*] Notice: The portion of the term of this patent subsequent to Jun. 7, 2005 has been disclaimed.

[21] Appl. No.: 904,142

[22] Filed: Sep. 8, 1986

Related U.S. Application Data

[63] Continuation-in-part of Ser. No. 777,031, Sep. 17, 1985, Pat. No. 4,749,214.

[51] Int. Cl.$^4$ .................. F16L 35/00; F16L 37/00
[52] U.S. Cl. .......................... 285/4; 285/39; 285/110; 285/319; 285/379; 138/89; 138/89.4; 277/DIG. 10
[58] Field of Search ................. 285/3, 4, 23, 39, 110, 285/319, 320, 379; 277/DIG. 10, DIG. 2, 237 R; 138/89, 89.4; 604/88, 201, 206, 237, 244

[56] References Cited

U.S. PATENT DOCUMENTS

| | | | |
|---|---|---|---|
| 584,091 | 6/1897 | Leidich | 604/237 |
| 2,441,344 | 5/1948 | Bosworth | 285/348 X |
| 3,654,965 | 4/1972 | Gramain | 285/137.1 |
| 3,711,125 | 1/1973 | Dehar | 285/319 X |
| 3,826,523 | 7/1974 | Eschbaugh | 285/319 X |
| 3,844,585 | 10/1974 | Sands et al. | 285/3 |
| 3,847,421 | 11/1974 | Eschbaugh et al. | 285/379 X |
| 4,326,569 | 4/1982 | Vaillancourt | 138/89 X |
| 4,329,857 | 5/1982 | Kittle et al. | 138/89 X |
| 4,331,146 | 5/1982 | Brignola | 604/244 |
| 4,395,800 | 8/1983 | Shindelaar | 138/89 X |
| 4,423,892 | 1/1984 | Bartholomew | 285/319 |
| 4,483,371 | 11/1984 | Susin | 138/89 X |
| 4,538,679 | 9/1985 | Hoskins et al. | 285/319 X |
| 4,541,658 | 9/1985 | Bartholomew | 285/319 |
| 4,607,664 | 8/1986 | Carney et al. | 285/3 X |
| 4,746,023 | 5/1988 | Belter | 277/DIG. 10 |

FOREIGN PATENT DOCUMENTS

| | | | |
|---|---|---|---|
| 2307154 | 8/1974 | Fed. Rep. of Germany | 285/319 |
| 2368663 | 5/1978 | France | 285/39 |
| 982004 | 2/1965 | United Kingdom | 285/3 |

Primary Examiner—Randolph A. Reese
Assistant Examiner—Anthony Knight

[57] ABSTRACT

A novel fluid coupling and seal assembly. The assembly includes a coupling body 12 having generally concentric first and second bores 36,38 of greater and lesser diameters, respectively, the first bore also being provided with a generally cylindrical groove 44. A resilient retainer 14 is assembled within the generally cylindrical groove, the retainer having a plurality of prongs 52 which extend inwardly and towards the second groove. A seal assembly 16 is disposed within the coupling body between the retainer and the second bore, the seal assembly including an O-ring 60 formed of an elastomeric material and a tearable diaphragm 64 integral with and of the same material as the O-ring and capable of blocking the passage of fluid through the O-ring prior to the insertion of a fluid line 24. The fluid line which is adapted to be associated with the coupling is provided with a flange 26 which is engaged by the free ends 58 of the resilient prongs to hold the fluid line within the coupling assembly.

33 Claims, 2 Drawing Sheets

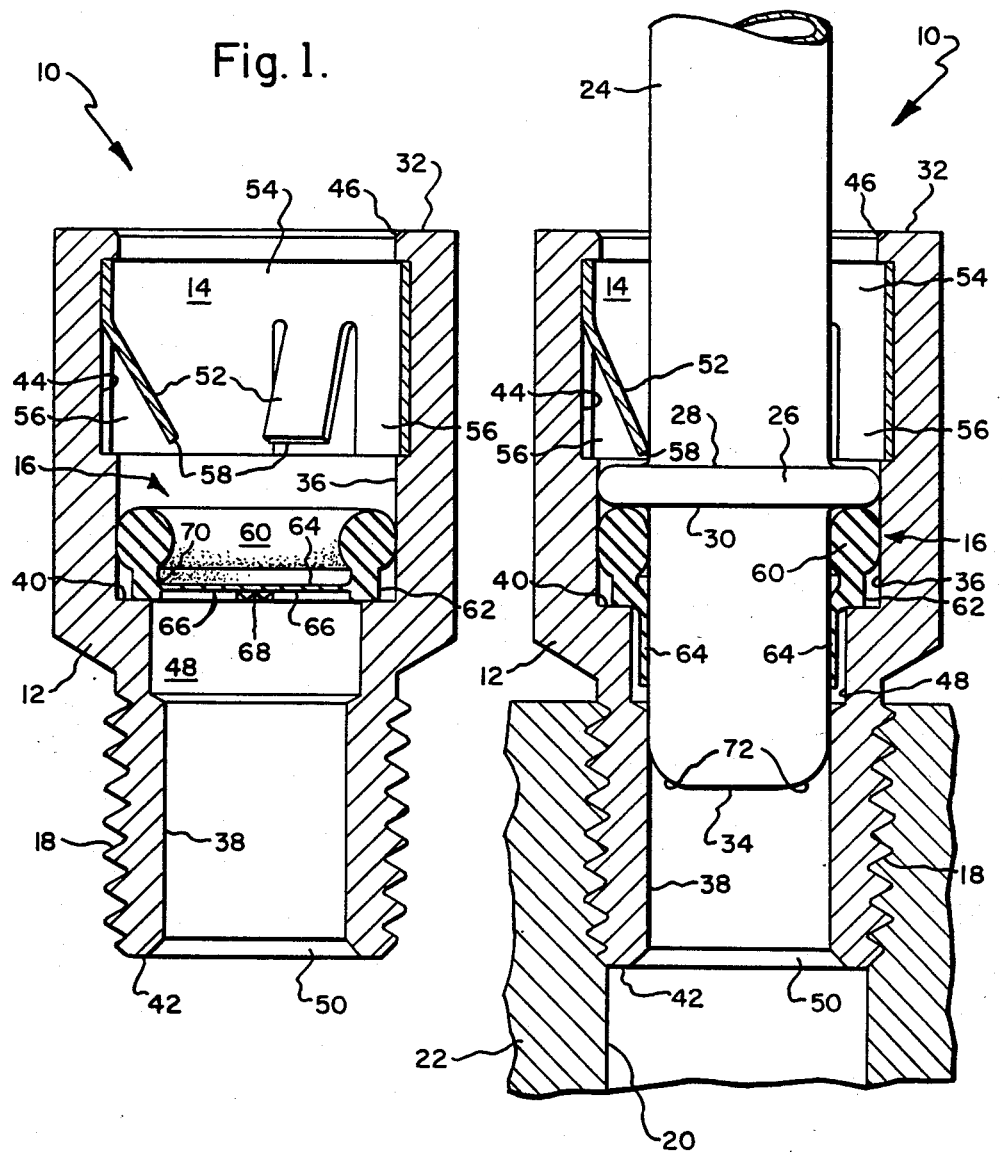

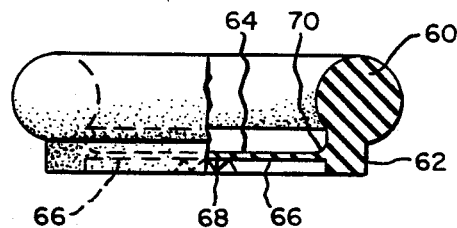
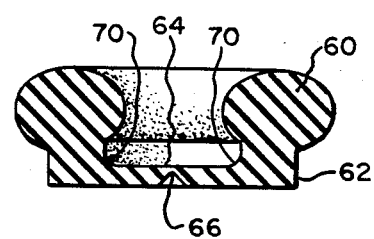
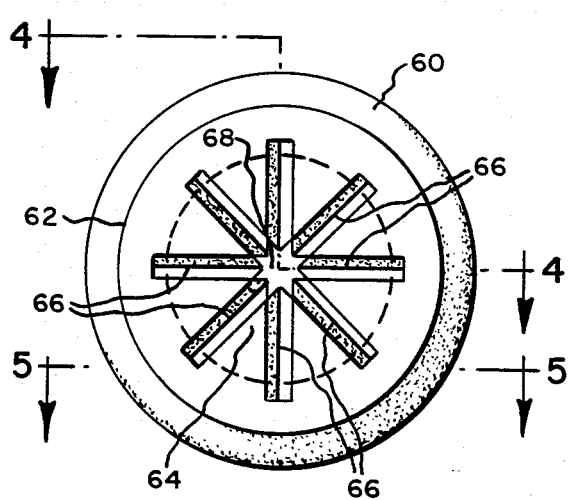
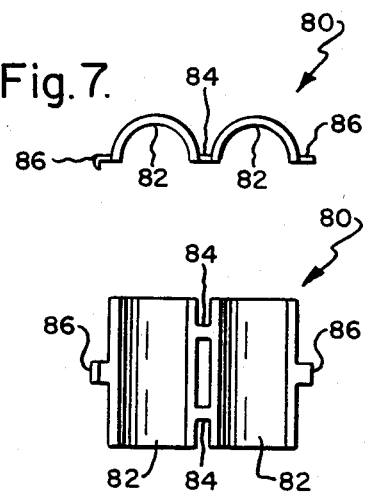
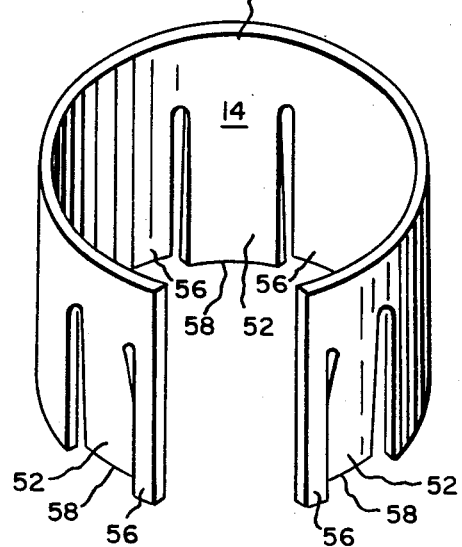

FLUID COUPLING AND SEAL ASSEMBLY

CROSS REFERENCE TO RELATED APPLICATIONS

The present invention is a continuation-in-part of U.S. application Ser. No. 777,031 filed Sept. 17, 1985 now U.S. Pat. No. 4,749,214, the subject matter of which is incorporated herein by reference thereto.

FIELD OF THE INVENTION

The present invention relates generally to fluid coupling and seal assemblies, and more particularly to a novel fluid coupling assembly including a novel seal assembly whereby a fluid line may be quickly connected to a port defining structure. The seal assembly initially blocks the passage of fluid through the coupling assembly prior to the insertion of a fluid line, and after the fluid line has been inserted, seals in a very satisfactory manner.

BACKGROUND OF THE INVENTION

Quick connect fluid couplings are well known in the art. Patents generally relevant to the design of this application are U.S. Pat. Nos. 2,441,344; 3,711,125; 3,826,523; 3,847,421; 4,423,892; 4,538,679 and 4,541,658. Also relevant is West German OS02307154. One common disadvantage of all of the foregoing designs is that when the coupling is assembled to a port in a housing which has previously been filled with fluid, such as transmission fluid in a transmission housing, it is necessary to provide a dunnage plug if the housing is to be moved prior to the insertion of a fluid line. In addition, many of the prior art designs are relatively expensive, exhibit poor performance characteristics under high vibration conditions, or are difficult to assemble and disassemble.

OBJECTS AND SUMMARY OF THE INVENTION

It is an object of the present invention to provide a novel seal assembly, the novel fluid coupling assembly incorporating a novel seal assembly, the assembly being of relatively low cost and which overcomes many of the disadvantages of the prior art.

The above object and other objects and advantages of this invention are accomplished by providing a coupling body having generally concentric first and second bores of greater and lesser diameters, respectively, the first bore also being provided with a generally cylindrical groove. A resilient retainer is assembled within the generally cylindrical groove, the retainer having a plurality of prongs which extend inwardly and towards the second groove. A seal assembly is disposed within the coupling body between the retainer and the second bore, the seal assembly including an O-ring formed of an elastomeric material and a tearable diaphragm integral with and of the same material as the O-ring and capable of blocking the passage of fluid through the O-ring prior to the insertion of a fluid line. The fluid line which is adapted to be associated with the coupling is provided with a flange which is engaged by the free ends of the resilient prongs to hold the fluid line within the coupling assembly.

The above will be more apparent after a consideration of the following detailed description taken in conjunction with the accompanying drawings in which a preferred form of this invention is illustrated.

BRIEF DESCRIPTION OF THE DRAWINGS

FIG. 1 is a sectional view through a coupling assembly which may be screwed into a threaded port in a housing or the like, the coupling assembly including a coupler body, a retainer, and a seal assembly provided with a tearable membrane which prevents the passage of fluid through the coupling assembly.

FIG. 2 is a view similar to FIG. 1 but showing the parts after the coupling body has been threaded into a threaded port in a housing or the like, and the end portion of a fluid line provided with a flange has been inserted into the coupling assembly breaking the tearable membrane.

FIG. 3 is a bottom view of the seal assembly shown in FIG. 1.

FIGS. 4 and 5 are sectional views taken generally along the lines 4—4 and 5—5 in FIG. 3.

FIG. 6 is a perspective view of the retainer illustrated in FIG. 1.

FIGS. 7 and 8 are top and side views, respectively, of a tool which may be utilized to remove the fluid line from the fluid coupling assembly.

DETAILED DESCRIPTION

Referring now to the drawings, the fluid coupling of this invention, which is indicated generally at 10, includes three major components, these being a coupling body 12, a resilient retainer 14, and a novel seal assembly indicated generally at 16. The coupling body 12, as shown in FIG. 1, is an integral structure machined from hex stock and provided with pipe threads 18 at one end so that by engaging the hex surface above the threads 18 the coupling body can be screwed into a threaded port 20 of a housing 22 or the like. While the coupling body is shown as a separate fitting which may be screwed into a tapped hole in a housing, it should be appreciated that the various novel features of the coupling body, which will be described below, could be formed directly in a housing or the like. In addition, the coupling body may be also provided with other suitable fluid components, such as a ball check valve, restricters, etc. In any event, the coupling body is adapted to receive the end portion of a fluid line 24 in fluid tight relationship, the end portion which is disposed within the coupling body being supported by the coupling body. The end portion of the fluid line is preferably formed of a relatively rigid material such as copper or aluminum tubing and is provided with an annular flange 26 which can either be a separate structure telescoped over the end portion of the tube 24 and rigidly secured thereto, or can merely be an upset portion of the tube. The flange has axially spaced apart first and second surfaces 28, 30, respectively, the first surface being closer to the outer surface 32 of the coupling body when assembled, and the second surface 30 being closer to the terminal end 34 of the fluid line.

The coupling body is provided with first and second coaxial bores 36, 38, respectively, which extend through the length of the coupler body. Disposed between the two bores is a radially inwardly extending surface 40. Thus, the first bore extends from the outer surface 32 to the surface 40 and the second bore 38 extends from the surface 40 to the inner surface 42. The first bore is provided with a generally cylindrical groove 44 disposed away from the surfaces 32 and 40.

In addition, the first bore may be provided with a tapered surface 46 adjacent the outer surface 32. The second bore is provided with a relief or enlarged diameter portion 48 adjacent the surface 40 and additionally may also be provided with a tapered surface 50 adjacent the inner surface 42. The design of the coupling body 12 is such that it can be readily manufactured on an automatic screw machine. It can also be an injection molded plastic part of suitable material.

The retainer 14 is best shown in its free state in FIG. 6 and is made of a suitably resilient integral piece of material such as 1050 steel which is hardened and plated after forming. It could also be made of a stainless steel such as 17–7. In any event, after forming, it has a radius just slightly greater than that of the cylindrical groove 44. However, since the retainer is of a C shape, it can be radially compressed and inserted into the coupler body 12 and then snapped into place within the cylindrical groove 44. The retainer is provided with three prongs 52 which are spaced 120° apart and extend radially inwardly and away from the outer surface of the coupling body when assembled within the coupler body. Disposed above the prongs 52 is a C-shaped portion 54 and skirt portions 56 are disposed between the prongs, the upper end of the skirt portions, as viewed in FIG. 1, being integrally connected to the C-shaped portion 54. The retainer can be produced on a (4-slide machine.) When the tube 24 is assembled into the coupling body 12, the free ends 58 of the prongs will be disposed closely adjacent to, or in contact with, the first surface 28 of the flange 26 as can best be seen from FIG. 2. When the body 12 is made by molding, the first portion 54 of the retainer 14 may be molded within the body 12.

The seal assembly is best shown in FIGS. 3–5 and is made from an integral piece of a rubber-like material suitable for forming an O-ring. Such suitable materials are Viton, Dupont's brand of fluorocarbon, neoprene, silicone rubber, etc. The assembly consists of three principal components, these being an O-ring 60, a collar 62 disposed to one side of the O-ring, and a tearable diaphragm 64 which extends across the assembly and is capable of blocking the passage of fluid through the O-ring before it is torn. The diaphragm is provided with a plurality of radially extending weakened portions or lines 66 which extend radially outwardly from a central weakened portion 68. The overall length of the weakened lines is approximately equal to the outside diameter of the fluid line 24. Rounded corners 70 are provided between the collar 62 and the diaphragm 64.

The parts are initially assembled by placing the seal assembly in the first bore 36 with the bottom of the collar being supported on the surface 40. Next, the retainer 14 is axially compressed, inserted into first bore and allowed to snap into secured relationship within the cylindrical groove 44. To this end, the combined length of the first portion 54 and the skirt portions 56 are equal to the axial length of the cylindrical groove 44 so that the retainer will not shift axially once assembled. The subassembly, shown in FIG. 1, can be shipped after assembly and the prongs 58 and surface 40 will insure that the seal assembly 16 is maintained in place. In addition, as the free diameter of the O-ring is greater than the inside diameter of bore 36, the O-ring, which is slightly compressed when assembled, will also tend to retain itself in place. If the coupling body 12 is to be secured to a threaded port 20 in a housing 22 or the like, it is then simply screwed into place. Next, it is only necessary to force the end of the fluid line into the coupling. In a typical situation, the fluid line will have a portion (not shown) supported relative to the housing 22. Therefore, in order to insure proper entry of the fluid line into the housing without cocking the O-ring, the length of the fluid line from the second surface 30 to the terminal end 34 is not greater than the distance between the outer surface 32 of the coupling body and that portion of the O-ring which would be compressed by the entry of the terminal end portion. In addition, the terminal end portion of the fluid line is preferably provided with rounded corners 72 to facilitate its entry into the O-ring. As the fluid line is inserted into the coupling, the terminal end 34 will first initially contact the diaphragm, then stretch the diaphragm, and finally tear the diaphragm along the weakened lines 66. The torn diaphragm will be received within the relief 48. When the fluid line has been fully inserted into the fluid coupling 10, the prongs 52 will prevent the withdrawal of the fluid line from the coupling, the O-ring 60 will be suitably axially compressed between the surface of the fluid line 24 and the surface of the first bore 36 to provide an adequate seal, and the torn diaphragm will also act as a lip seal about the fluid line. The diameter of the flange 26 is just slightly less than the diameter of the first bore 36, and the diameter of the fluid line which is received within the second bore 38 is also just slightly les than the diameter of the second bore. It can therefore be seen that once the fluid line 24 is assembled within the coupling, it is supported by the first and second bores.

Referring now to FIGS. 7 and 8, a tool is illustrated which may be utilized for removing the fluid line from the fluid coupling assembly. The tool, indicated generally at 80, consists of two semi-cylindrical portions 82, 82 which are hinged together by hinges 84. The semi-cylindrical portions can be brought together to form a cylindrical element and can be held in the assembled position by latch elements 86. The tool can be made of any suitable material and one such suitable material would be polypropylene. The tool is utilized by closing it about the fluid line 24 and then forcing it downwardly into the cavity between the fluid line and the free ends 58 of prongs 52 to force the prongs radially outwardly to such an extent that the fluid line and tool can be removed from the retainer 14.

While a preferred embodiment has been disclosed above, it is to be understood that this invention is not to be limited to the above embodiments as various alternative embodiments will occur to those having ordinary skill in the art.

What is claimed is:

1. A seal assembly comprising an annular seal formed of a rubber-like material and a tearable diaphragm integral with and of the same material as the annular seal and capable of blocking the passage of fluid through the annular seal, the tearable diaphragm being provided with weakened portions which permit a central portion of the tearable diaphragm to tear when a tubular fluid line is inserted into the annular seal, the weakened portions not extending entirely about a central portion of the diaphragm whereby the central portion will be retained by the annular seal after tearing.

2. A fluid coupling assembly to which a fluid line may be connected, the fluid line having an end portion which is adapted to be assembled within the fluid coupling assembly, the end portion having an intermediate outwardly extending flange provided with axially spaced apart first and second surfaces, the second surface being disposed more closely adjacent the terminal end of the fluid line than the first surface; the fluid coupling assembly comprising:

- a coupling body having generally concentric first and second bores extending through the body, the first bore extending inwardly from the outer surface of the body, and the second bore extending inwardly from the first bore and being of a smaller diameter than the first bore to provide a radially inwardly extending surface between the bores;
- a resilient retainer assembled within the coupling body and capable of engaging the first surface of the flange to retain the end portion of the fluid line within the body, the resilient retainer including a first portion engaging the coupling body between the outer surface and the inwardly extending surface and a plurality of prongs disposed within the first bore, one end of each of the prongs being integral with the first portion and the prongs extending radially inwardly and away from the outer surface of the coupling body, the free ends of the prongs being adapted to contact a first surface of a flange carried by an end portion of a fluid line when the end portion of the fluid line is assembled within the body; and
- a seal assembly disposed within the coupling body between the retainer and the radially inwardly extending surface, the seal assembly including an annular seal formed of a rubber-like material and a tearable diaphragm integral with and of the same material as the annular seal and capable of blocking the passage of fluid through the annular seal.

3. The assembly as set forth in claim 2 wherein the tearable diaphragm is provided with weakened portions.

4. The assembly as set forth in either claim 1 or claim 3 wherein the weakened portions are lines which extend radially outwardly from a central weakened portion.

5. The assembly as set forth in claim 2 wherein the tearable diaphragm is provided with weakened lines on that side of the diaphragm remote from the retainer.

6. The assembly as set forth in claim 2 wherein the tearable diaphragm is provided with a plurality of intersecting diametrically extending weakened lines, the length of the weakened lines being approximately equal to the outside diameter of the fluid line.

7. The assembly as set forth in claim 2 wherein the tearable diaphragm is disposed to one side of the annular seal adjacent the radially inwardly extending surface of the coupling body.

8. The assembly as set forth in claim 2 wherein the coupling body is injection molded, the first portion of the retainer being molded within the coupling body.

9. The assembly as set forth in claim 2 wherein the first bore of the coupling body is provided with a generally circular groove, and wherein the first portion of the resilient retainer is disposed within the circular groove.

10. The assembly as set forth in claim 2 wherein the second bore has an enlarged diameter portion adjacent the radially inwardly extending surface for the reception of the diaphragm after it has been torn during the insertion of a fluid line.

11. The assembly as set forth in either claim 1 or claim 2 where in the annular seal is an O-ring.

12. The assembly as set forth in claim 11 wherein the tearable diaphragm is disposed to one side of the O-ring.

13. The assembly as set forth in claim 12 further characterized by the seal assembly including a collar extending axially to one side of the O-ring, the diaphragm being supported by the collar.

14. The assembly as set forth in claim 13 wherein the seal assembly further includes rounded corners between the collar and the diaphragm.

15. A fluid coupling assembly:

- a housing or the like provided with a port;
- a coupling body received within the port, the coupling body having generally concentric first and second bores extending through the body, the first bore extending inwardly from the outer surface of the body, and the second bore extending inwardly from the first bore and being of a smaller diameter than the first bore to provide a radially inwardly extending surface between the bores, the first bore further being provided with a generally circular groove;
- a resilient retainer assembled within the coupling body, the resilient retainer including a C-shaped first portion received with the generally circular groove and a plurality of prongs, one end of each of the prongs being integral with the C-shaped first portion and the prongs extending radially inwardly and away from the outer surface of coupling body;
- a fluid line having an end portion assembled within the coupling body, the end portion including an intermediate outwardly extending flange having axially spaced apart first and second surfaces, the first surface being disposed adjacent the free end of the prongs whereby the retainer prevents the withdrawal of the end portion of the fluid line from the coupling body; and
- a seal assembly including an O-ring in sealing engagement with the first bore and the fluid line between the flange and the terminal end of the fluid line.

16. The assembly as set forth in claim 2 or 15 wherein the coupling body is formed from an integral piece of material.

17. The assembly as set forth in either claim 2 or 15 wherein the coupling body is provided with an externally threaded end portion.

18. The assembly as set forth in claim 17 wherein the coupling is further provided with an external hex surface capable of being engaged by a wrench or the like.

19. The assembly as set forth in either claim 9 or 15 wherein the circular groove is a right cylinder.

20. The assembly as set forth in claim 19 wherein the retainer is further provided with skirt portions between the prongs, one end of the skirt portions being integrally connected with the first portion of the retainer and the skirt portions being of the same length as the prongs.

21. The assembly as set forth in claim 20 wherein the combined length of the skirt portions and the first portion are essentially the same length as the axial length of the circular groove within the coupling body.

22. The assembly as set forth in claim 21 wherein the first portion and the skirt portions are all segments of a cylinder, the surface of the cylindrical segments having a radius when unassembled slightly greater than the radius of the generally circular groove, and the first portion, when assembled within the coupling body, having a radius equal to the radius of the generally circular groove.

23. The assembly as set forth in claim 2 or 15 wherein the retainer is provided with three prongs spaced approximately 120° away from each other.

24. The assembly as set forth in claim 15 wherein the port is threaded.

25. The assembly as set forth in claim 24 wherein the coupling body is provided with external threads at one end for connecting the coupling body to the threaded port.

26. The assembly as set forth in claim 15 wherein the diameter of the flange is just slightly less than the diameter of the first bore.

27. The assembly as set forth in either claim 15 or 26 wherein the fluid line diameter is just slightly less than the second bore diameter.

28. The assembly as set forth in claim 15 wherein the length of the fluid line from the second surface of the flange to the terminal end is not greater than the distance between the outer surface of the coupling body and the O-ring.

29. The assembly as set forth in claim 15 wherein the terminal end of the fluid line has a rounded surface to facilitate its entry into the O-ring.

30. The assembly as set forth in claim 15 wherein the second bore has an enlarged diameter portion adjacent the radially inwardly extending surface.

31. The assembly as set forth in claim 30 wherein the seal assembly is initially provided with a tearable diaphragm, the torn diaphragm being disposed within the enlarged diameter portion of the second bore to provide a lip seal.

32. A resilient retainer for use in a fluid coupling assembly to which a fluid line having an outwardly extending flange may be connected, said resilient retainer comprising:

a generally cylindrically shaped radially compressible body portion which is C-shaped in cross section, said body portion being formed of resilient metal or the like, a plurality of prongs formed of the same material as the body portion, one end of each of the prongs being integral with the body portion, the prongs extending inwardly in the same direction at an acute angle to the adjacent surface of the body portion, and a plurality of skirt portions between the prongs, which skirt portions are coextensive extensions of the body portion, the skirt portions all being at least as long as the prongs.

33. The retainer as set forth in claim 32 wherein the skirt portions are of the same length as the prongs.

* * * * *